United States Patent [19]
Seraj

[11] Patent Number: 6,055,434
[45] Date of Patent: *Apr. 25, 2000

[54] METHOD AND SYSTEM FOR LOCATING A MOBILE STATION WITHIN A MOBILE TELECOMMUNICATIONS NETWORK

[75] Inventor: Jila Seraj, Dublin, Ireland

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,956

[22] Filed: Feb. 11, 1997

[51] Int. Cl.$^7$ .................................................. H04Q 7/20
[52] U.S. Cl. ........................................ 455/456; 455/422
[58] Field of Search .................................... 455/404, 422, 455/432, 436, 445, 456, 457, 466; 342/450, 451, 457

[56] References Cited

U.S. PATENT DOCUMENTS

| | | | |
|---|---|---|---|
| 5,375,161 | 12/1994 | Fuller et al. | 455/445 X |
| 5,515,419 | 5/1996 | Sheffer | 379/58 |
| 5,519,760 | 5/1996 | Borkowski et al. | 455/456 |
| 5,546,445 | 8/1996 | Dennison et al. | 455/456 |
| 5,570,412 | 10/1996 | LeBlanc | 455/456 |
| 5,586,167 | 12/1996 | Handforth | 455/456 |
| 5,600,706 | 2/1997 | Dunn et al. | 455/456 |

FOREIGN PATENT DOCUMENTS

| | | |
|---|---|---|
| 0705046 | 8/1995 | European Pat. Off. . |
| WO 92/02104 | 7/1991 | WIPO . |

OTHER PUBLICATIONS

PCT Search Report dated Oct. 12, 1998 for PCT/US 98/02231.

*Primary Examiner*—Dwayne D. Bost
*Assistant Examiner*—Nay Maung
*Attorney, Agent, or Firm*—Jenkens & Gilchrist PC

[57] ABSTRACT

A plurality of low powered beacons are selectively placed throughout a serving mobile telecommunications network without connecting the beacons and the telecommunications network therebetween. Each of the beacons independently transmits identification data uniquely identifying itself. An application module and a mapping table correlating each identification data with the location of the corresponding beacon are associated with the serving mobile telecommunications network. As a mobile station travels within the serving mobile telecommunications network, the mobile station receives the identification data broadcast by the closest beacon located thereto. In connection with a call connection, the mobile station then transmits the received identification data to the serving mobile telecommunications network. By determining the location of the identified beacon, the mobile telecommunications network then determines that the mobile station is located approximate thereto.

19 Claims, 4 Drawing Sheets

METHOD AND SYSTEM FOR LOCATING A MOBILE STATION WITHIN A MOBILE TELECOMMUNICATIONS NETWORK

BACKGROUND OF THE INVENTION

1. Technical Field of the Invention

The present invention relates to a mobile telecommunications network and, in particular, to a method and system for determining the current geographic location of a mobile station.

2. Description of Related Art

Within a fixed or wireline telecommunications network, a geographic location associated with a particular wireline subscriber has always been determinable. A physical circuit connection between a telecommunications exchange and a telecommunications terminal connected thereto readily identifies the exact location of the associated wireline subscriber. As a result, in response to a need to locate a wireline subscriber, the serving telecommunications exchange merely has to perform a line trace along the circuit connections to determine the location of the calling party subscriber. Alternatively, the serving telecommunications exchange can determine the directory number associated with the calling party subscriber. The ascertained directory number is physically associated with a particular access line (telephone line) and can then be translated into an exact geographic location.

Unlike the wireline telecommunications system, locating a mobile subscriber within a mobile telecommunications network is much more difficult. By effectuating communication by way of a radio link, a mobile station is able to travel throughout the geographic area covered by a mobile telecommunications network and be served by any one of the associated mobile telecommunications exchanges, such as mobile switching centers (MSC), and/or base station controller (BSC). As a result, it is no longer sufficient to merely determine the associated directory number to ascertain the current location of the mobile station. Furthermore, no wireline circuit connection is available for purposes of ascertaining location data.

A number of methods and mechanisms have been introduced to determine the geographic location of a mobile station. Such methods include triangulation or arcuation methods utilizing the signal strength received from three or more neighboring cells or base transceiver stations (BTSs). Other mechanisms include the Global Positioning System (GPS) utilizing multiple satellites and associated signals to ascertain the current geo-coordinates. Other more crude methods include merely determining the current cell or coverage area associated with the mobile station and identifying the approximate geographic area associated thereof. A number of other mechanisms and devices are already well known within the mobile telecommunications field for locating a mobile station.

With the popularity of mobile stations and a drastic increase in the number of mobile subscriptions in recent years, mobile service providers and/or associated government agencies want to be able to more accurately locate mobile stations. For example, the Federal Communications Commission (FCC) has released a mandate requiring all mobile service providers in the United States to be able to pin-point a mobile station with an accuracy of one hundred fifty (150) meters in case of an emergency call (911 call). Such a location determination then enables a Public Safety Answer Point (PSAP) to provide effective emergency assistance to mobile subscribers in need of help.

Unfortunately, all of the conventionally known location methods or mechanisms are either too inaccurate or too sail expensive. For example, the GPS location system requires each mobile station to be equipped with an expensive GPS locator. The triangulation and other cell strength methods, on the other hand, are too inaccurate to provide satisfactory location data. Furthermore, since each cell may cover a few miles in radius, identifying the serving cell is similarly inadequate to accurately locate the mobile station. As a result, in order to more accurately determine the geographic location of a mobile station without requiring the mobile station to be equipped with an additional device, cell coverage areas need to be reduced. By reducing each cell coverage area and increasing the number of BTSs, a more accurate calculation of mobile station location can be performed. Such dense cell planning is, however, expensive and impractical.

Accordingly, there is a need for a mechanism to provide an economical, yet accurate, mobile station location system.

SUMMARY OF THE INVENTION

A mobile station located within a mobile telecommunications network receives identification data broadcast from one of a plurality of transmitters or beacons selectively placed throughout the mobile telecommunications network. The identification data broadcast by each of the beacons uniquely identifies the beacon and are broadcast over a limited coverage area associated with each beacon. The beacons are strategically placed to minimize overlaps in such coverage areas.

As a particular mobile station travels, the mobile station receives the broadcast identification data from one of the beacons located closest thereto. In connection with a subsequent subscriber request to establish a call connection with a particular telecommunications terminal (TT), the mobile station transmits the received identification data towards the serving mobile telecommunications network. The serving mobile telecommunications network, by mapping the transmitted location data identifying the beacon with its internal mapping table, is then able to identify the location of the beacon. The mobile station is then determined to be located approximate thereto.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
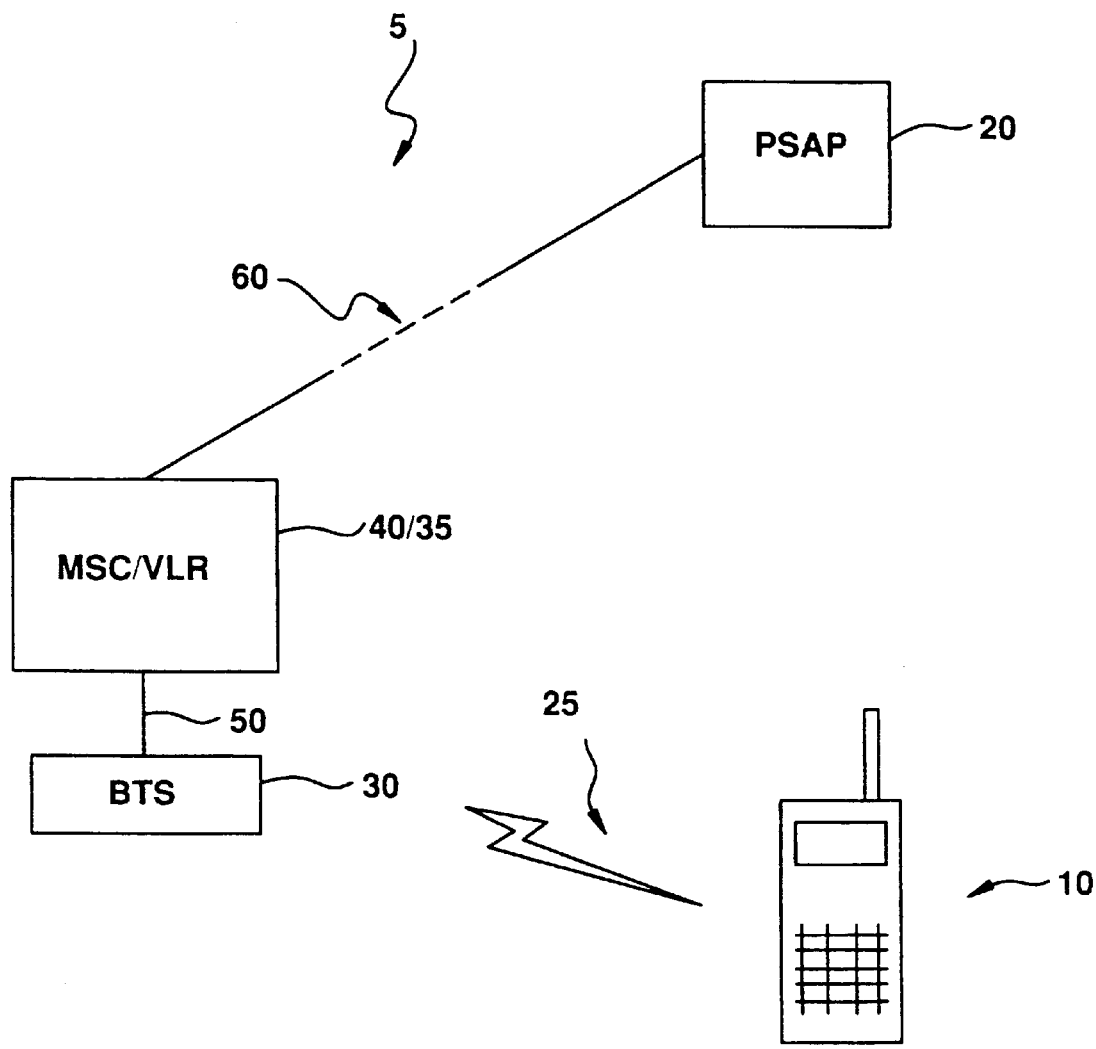
FIG. 1 is a block diagram of a mobile telecommunications network illustrating a call connection between a mobile station and another telecommunications terminal.

FIG. 1 is a block diagram of a telecommunications network 5 illustrating a call connection between a mobile station 10 and another telecommunications terminal (TT) 20, such as a Public Safety Answering Point (PSAP) terminal. The mobile station 10 originates an emergency call connection towards the PSAP terminal 20 by merely dialing a predetermined short number, such as 9-1-1 in the United States. An emergency call connection may further be established via a number of other methods, such as entering a service code or selecting a menu option. An over-the-air signal 25 is then received by a base transceiver station (BTS) 30 providing radio coverage for that particular geographic area associated with the requesting mobile station 10. The received signal is then forwarded to an associated mobile switching center (MSC) 40 and visitor location register (VLR) 35 via an interface link 50 connected therebetween. The MSC 40 and VLR 35 are often co-located with each other, and are hereinafter collectively referred to as an MSC/VLR. The serving MSC/VLR 40/35 then recognizes that the mobile station 10 is requesting an emergency call connection, and establishes a call connection 60 towards the associated PSAP 20. Once the connection 60 is established, the mobile station 10 may request emergency assistance from or report an emergency situation towards the PSAP 20.

Figure 2:
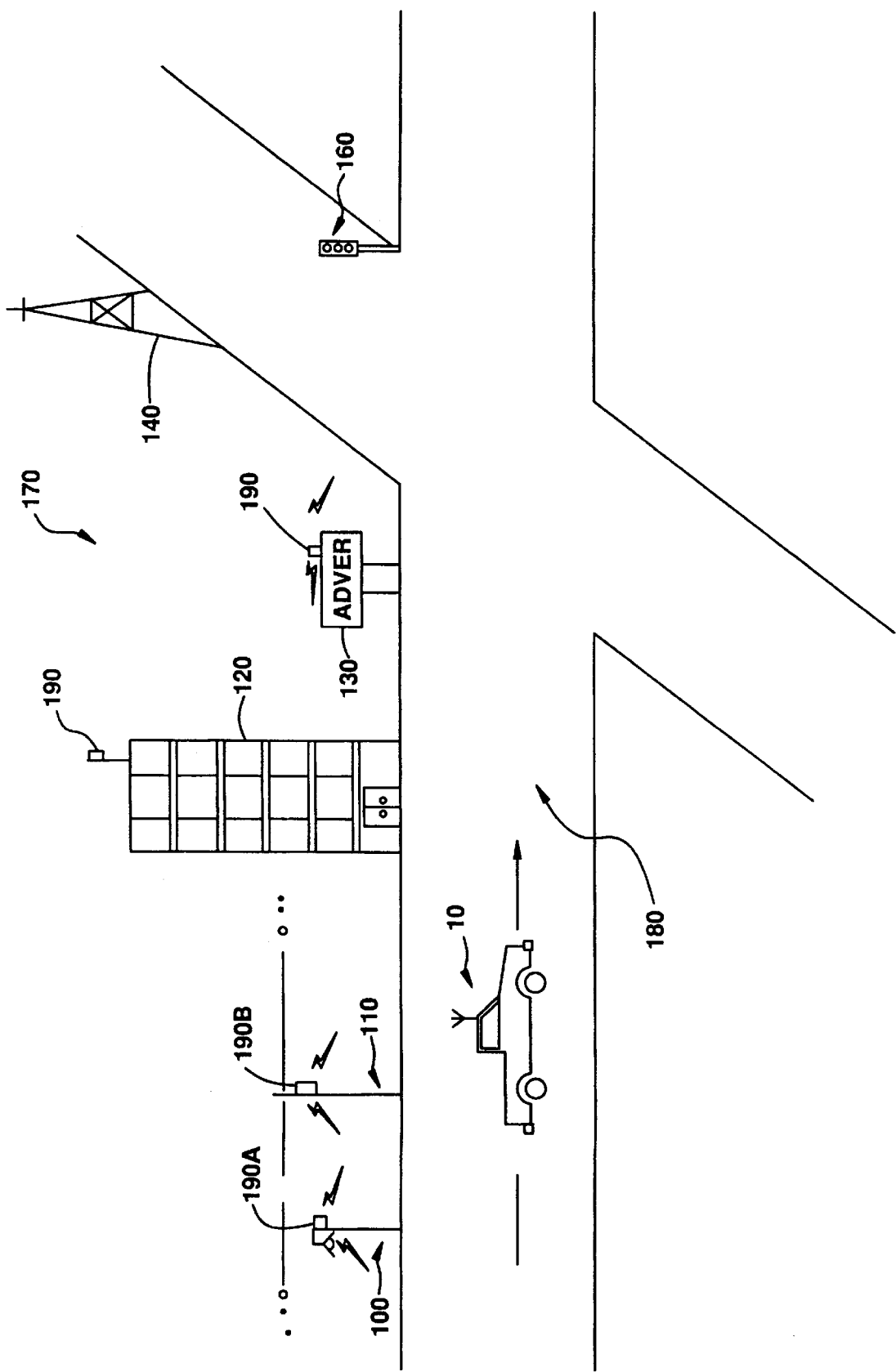
FIG. 2 is a pictorial diagram illustrating the placement of multiple beacons throughout a serving mobile telecommunications network.

FIG. 2 is a pictorial diagram illustrating the placement of multiple beacons throughout a serving mobile telecommunications network in accordance with the teachings of the present invention. A particular base transceiver station (BTS) 140 provides radio coverage for a particular cell area 170. Instead of reducing the cell areas 170 associated within a particular serving mobile telecommunications network, a plurality of separate independent transmitters (hereinafter referred to as "beacons") 190 are selectively placed throughout the geographic area covered by the serving mobile telecommunications network. As illustrated in FIG. 2, most geographic area, such as the cell area 170, covered by the mobile telecommunications network have access to power sources. For example, street light poles 100, power line poles 110, bill-boards 130, buildings 120, and traffic lights 160 all have easy access to electrical power. Instead of relying on the base transceiver station (BTS) 140 providing radio coverage for the current cell area 170 to identify the current geographic location, a number of reduced power beacons 190 are placed strategically throughout the cell area 170. The beacons 190 may be mounted to the light pole 100, power line pole 110, building 120, bill-board 130, and traffic light 160. Furthermore, in case no electrical power sources are readily available, the beacons may further be associated with a device utilizing natural resources. For example, a solar panel or wind mill can be utilized to power the associated beacon. Each beacon 190 then broadcast its own unique identification data and provides coverage for a limited geographic area which is much smaller than the cell area 170. Furthermore, such beacons are strategically placed to reduce the coverage overlap with respect to adjacent beacons. They may further be placed to reduce signal interferences and impediments.

Placing such beacons throughout a geographic area being covered by a serving mobile telecommunications network is easier and more economical than restructuring the existing mobile telecommunications infrastructure. Such beacons do not have to be connected to each other. Furthermore, there is no need for these beacons to communicate with the serving mobile telecommunications network. Accordingly, the beacons 190 do not have to be equipped with radio transmitters for transmitting over-the-air signals to the serving BTS or MSC/VLR, or with circuit connections for transmitting on-line data to the serving telecommunications network. They are pre-programmed to periodically broadcast their own identification number or data independently. Since most of the mentioned structures or poles already placed along side streets and roads have access to electrical power, the beacons need to merely be connected to such power sources and be "turned on" to broadcast the low powered identification data.

The operation of such beacons may further be independent of the serving service provider. Thus, the beacons 190 may be programmed to broadcast the identification data over a number of different frequencies and/or channels to service multiple mobile telecommunications systems. For example, within typical metropolitan cities within the United States, a number of different telecommunications systems are provided within the same geographic area. Such telecommunications systems include Advanced Mobile Phone Service (AMPS), Digital Advanced Mobile Phone Service (DAMPS), Global Standard for Mobile (GSM) communications, etc., each using its own analog or digital frequencies and/or channels for effectuating communication. The beacons 190 broadcast the identification data over the appropriate/assigned frequencies and channels associated with the available mobile telecommunications systems to ensure that all type of mobile stations, regardless of which telecommunications service it is associated, can receive the transmitted data.

Within a digital communications system, an individual communication channel, such as a broadcast channel, is allocated for communicating such data. Within an analog communications system, a particular frequency is reserved for similarly communicating such data. Mobile stations are then programmed to "listen" to the assigned channel or frequency to receive the location data being broadcast by each beacon.

A mobile station traveling within the cell area 170 then receives particular identification data broadcast by one of the beacons 190 located closest thereto. Such a reception can be made by selecting the identification data received from the beacon 190 with the strongest signal strength. Such a selection mechanism is already well known within the radio communication field. As an illustration, as an automobile associated with a particular mobile station 10 travels down the street 180, a receiver coupled to the mobile station 10 initially receives the identification data broadcast by the first beacon 190A associated with the light pole 100. As the automobile travels out of the coverage area being supported by the first beacon 190A and into a coverage area being supported by a second beacon 190B, the identification data identifying the second beacon 190B are similarly received.

Figure 3:
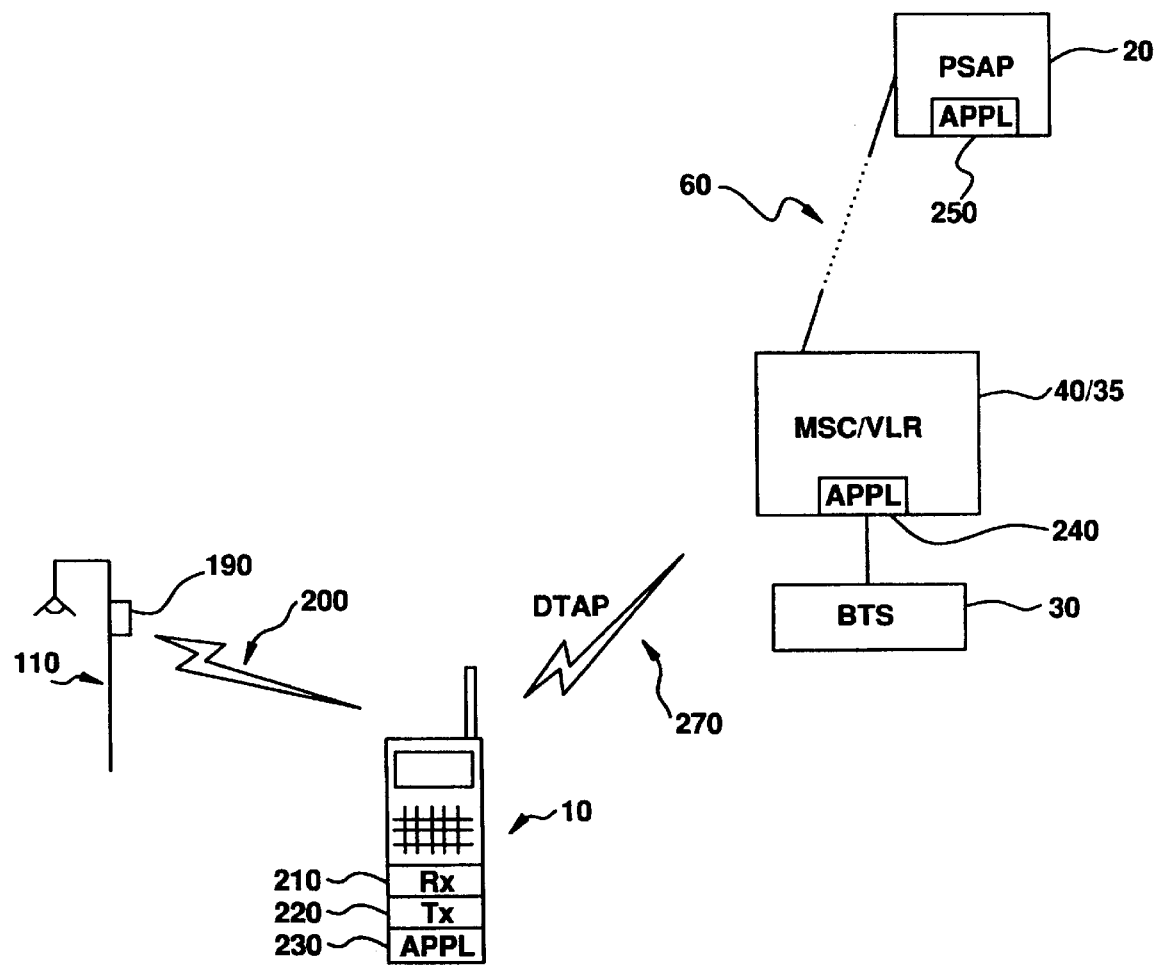
FIG. 3 is a block diagram of a mobile telecommunications network illustrating a mobile station receiving identification data from one of the beacons and transmitting the received identification data to the serving mobile switching center/visitor location register (MSC/VLR)

Reference is now made to FIG. 3 illustrating a mobile station 10 receiving identification data 200 from one of the beacons 190 and transmitting the received identification data to the serving MSC/VLR 40/35 in accordance with the teachings of the present invention. As described in reference to FIG. 2, as the mobile station 10 travels within a particular cell area, the mobile station 10 receives identification data associated with a particular beacon 190 located closest thereto. As an illustration, the beacon 190 attached to the light pole 110 broadcast data uniquely identifying the beacon over a limited geographic area encompassing the traveling mobile station 10. A receiver (Rx) 210 associated with the mobile station 10 monitors the pre-allocated or assigned channel or frequency and receives the broadcast identification data 200 from the nearby beacon 190. Thereafter, in response to a subscriber request to originate a call connection towards a particular telecommunications terminal, such as the PSAP 20, an application module 230 associated with the mobile station 10 instructs the associated transmitter (Tx) 220 to transmit the received identification data towards the serving mobile telecommunications network.

As an alternative, the mobile station 10 may also receive and transmit identification data associated with a plurality of beacons. For example, the identification data associated with three different beacons with the strongest signal may be transmitted to the mobile telecommunications network. The transmitted data representing the plurality of beacons may enable a more accurate determination of the mobile station's current location. Such a determination can be made by utilizing a number of known techniques, such as a triangulation method, in locating a mobile station.

In one embodiment of the present invention, a call setup signal, such as a Direct Transfer Application Part (DTAP) signal, requesting call connection towards a particular called party number encapsulates and transports the received identification data. The transmitted DTAP signal 270 is then received by the BTS 30 serving that particular cell area. The BTS 30 then forwards the received call setup request to the associated MSC/VLR 40/35. An application module 240 associated with the serving MSC/VLR 40/35 then retrieves the encapsulated identification data from the received call setup signal, translates the identification data to identify the associated beacon 190, and by evaluating the mapping table, determines where the beacon 190 is located. Since the beacons 190 are low powered and transmit their identification data over a limited geographic area much smaller than the 1serving cell area, the application module 240 then identifies that the mobile station 20 is located approximate thereto. As an illustration, if the beacons are placed less than one hundred and fifty (150) meters apart, and programmed to broadcast the identification data over a geographic area encompassing less than seventy-five (75) meters in radius, the application module 240 can determine the mobile station with a one hundred and fifty (150) meter accuracy. The positioning of each beacon and the distance therebetween may be strategically determined by considering a number of different factors. Such factors include the availability of power sources, the overall geographic area to be covered, and the desired accuracy in pin-pointing the location of a mobile station.

Instead of associating the application module 240 and its mapping table within each serving MSC/VLR 40/35, the application module 240 and the mapping table may be located within a centralized place. As an illustration, an application module 250 associated with the PSAP 20 instead receives the transmitted identification data over the call connection 60 and determines the exact location of the mobile station 10. Such identification data can be transmitted over an Integrated Service Digital Network User Part (ISUP) based signal, Transaction Capability Application Part (TCAP) based signal, or other packet data communicated therebetween.

Furthermore, the application module 230 associated with the mobile station 10 periodically transmits the latest received identification data towards the serving mobile telecommunications network until instructed otherwise. Such an instruction includes a service code instructing the mobile station to terminate the transmission of the identification data. Alternatively, the serving mobile telecommunications network may instruct the mobile station to cease transmitting the beacon identification data. Otherwise, even if the call connection is inadvertently terminated, the transmission continues. Similarly, in case the mobile station is turned off or loses power (battery), the application module continues to re-transmit the identification data after being turned or powered on again.

The beacons are usually aligned with streets, roads, or buildings within the serving telecommunications network area. By keeping track of the different identification data received from the mobile station as the mobile station travels from one geographic location to another geographic location, the application modules 240–250 can easily determine the direction or route of the traveling mobile station 10.

Figure 4:
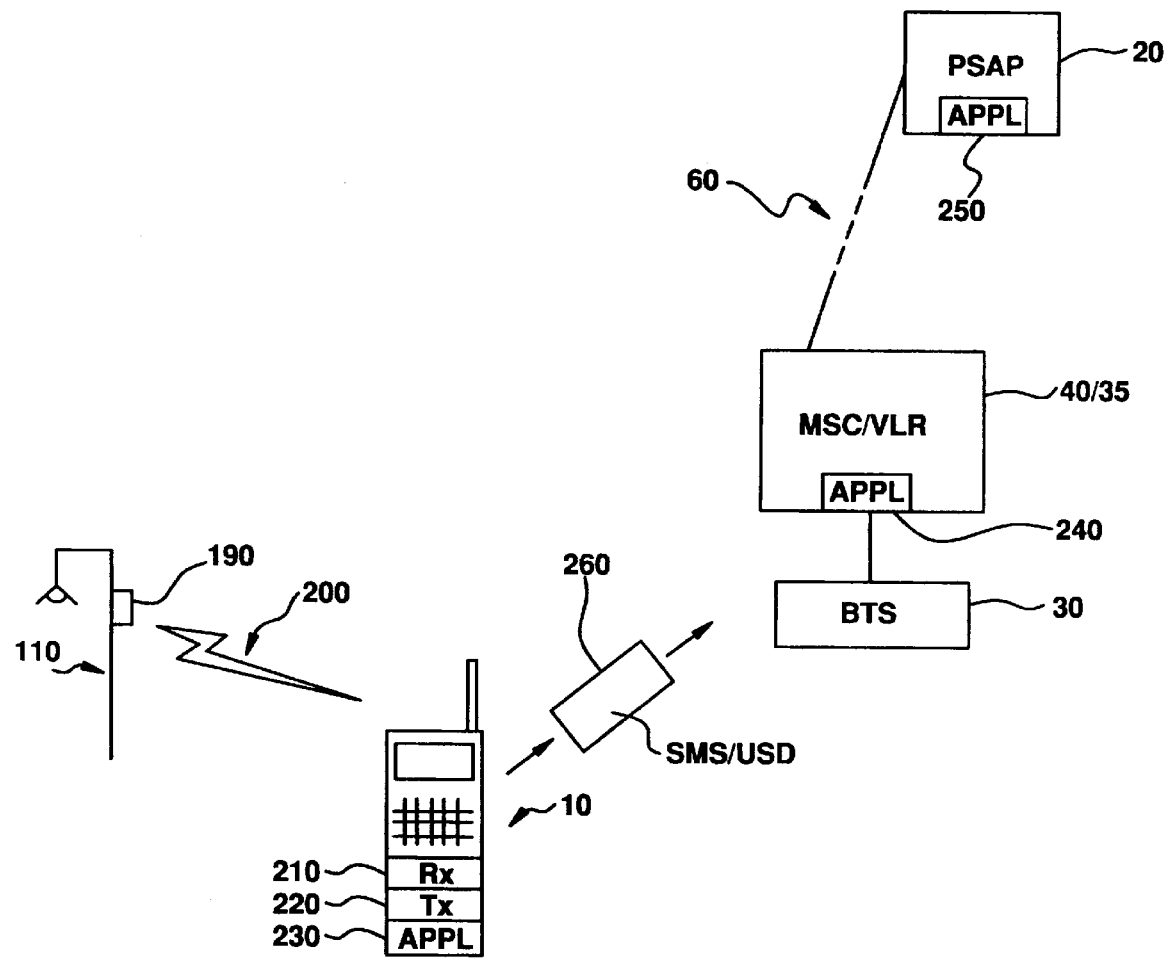
FIG. 4 is a block diagram of a mobile telecommunications network illustrating a mobile station transmitting the received identification data to the serving MSC/VLR in accordance with another embodiment of the present invention.

Reference is now made to FIG. 4 illustrating the mobile station 10 transmitting the received identification data to the serving MSC/VLR 40/35 in accordance with another embodiment of the present invention. In a similar manner as described in FIG. 3, the receiver 210 associated with the mobile station 10 receives the broadcast identification data 200 from the beacon 190 closely located thereto. In connection with a call connection towards a particular telecommunications terminal, the application module 230 associated with the mobile station 10 encapsulates the received identification data within an unstructured data message. The associated transmitter 220 then transports the message over to the serving MSC/VLR 40/35. As an illustration, the application module encapsulates the identification data within a Short Message Service (SMS) message 260 and instructs the transmitter 220 to transmit the SMS message 260 over one of the control channels, such as a Stand-alone Dedicated Control Channel (SDCCH). An Unstructured Supplementary Service Data (USSD) message can similarly be utilized to transport the identification data. The transmitted SMS/USSD message 260 is received by the serving BTS 30 and forwarded to the serving MSC/VLR 40/35. The application modules 240–250 then translates the received identification data, identifies the beacon 190 associated with the received identification data, and identifies that the mobile station 10 is located approximate to the location associated with the identified beacon 190.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for locating a mobile station within a mobile telecommunications network, comprising:

a mobile telecommunications node for providing mobile service over a particular geographic area;

a plurality of beacons, each of said plurality of beacons having a known location and being selectively placed throughout said particular geographic area and broadcasting identification data identifying said beacon, wherein said plurality of beacons are not connected to said mobile telecommunications node;

a mobile station for effectuating a call connection with said mobile telecommunications network, said mobile station further comprising:

a receiver for receiving said identification data from at least a portion of said plurality of beacons; and a transmitter for communicating said received identification data for certain plural ones of said plurality of beacons with the strongest received signal strength towards said mobile telecommunications node; and an application module associated with said mobile telecommunications network and configured to determine the location of said mobile station as being approximate to the known locations of said certain plural ones of the plurality of beacons with the strongest received signal strength identified by the received identification data communicated from the mobile station.

2. The system of claim 1 further associated with a telecommunications terminal (TT) and wherein said transmitter associated with said mobile station transmits said identification data within a call setup signal requesting a call connection between said mobile station and said TT.

3. The system of claim 2 wherein said call setup signal comprises a Direct Transfer Application Part (DTAP) signal encapsulating said location data.

4. The system of claim 1 further comprising a control channel for communicating information between said mobile station and said mobile telecommunications node, and wherein said transmitter associated with said mobile station transmits said identification data using a packet signal transmitted over said control channel.

5. The system of claim 4 wherein said packet signal comprises a Short Message Service (SMS) signal transmitted over said control channel.

6. The system of claim 2 wherein said transmitter associated with said mobile station periodically transmits said location data during a call connection with the mobile telecommunications network.

7. A method for approximating a current location of a particular mobile station within a mobile telecommunications network, wherein a plurality of beacons having known locations are selectively located within geographic area covered by said mobile telecommunications network, each of said beacons independently broadcasting a signal without communicating with said mobile telecommunications node, said method comprising the steps of:

receiving radio signal broadcasts by a particular mobile station from at least a portion of said plurality of beacons located close to said mobile station, said radio signal broadcasts including identification data identifying each of said beacons;

transmitting a request for a call connection with a particular telecommunications terminal (TT) towards a serving mobile telecommunications node by said mobile station;

communicating at least the identification data for certain plural ones of said plurality of beacons with the strongest received signal strength from said mobile station to said telecommunications node in connection with said requested call connection;

periodically communicating said at least the identification data for certain plural ones of said plurality of beacons with the strongest received signal strength towards said telecommunications node during the call connection until instructed otherwise, and processing the periodically communicated beacon identification data to identify the location of said mobile station as being approximate to the known locations of said certain plural ones of said plurality of beacons with the strongest received signal strength identified by said beacon identification data.

8. The method of claim 7 wherein said mobile station receives said identification data over a radio channel assigned for broadcasting said identification data from said plurality of beacons.

9. The method of claim 7 wherein said TT comprises a Public Safety Answering Point (PSAP) terminal.

10. The method of claim 7 wherein said step of communicating said identification data further comprises the step of including said identification data within a call setup request signal transmitted in connection with said call connection towards said TT.

11. The method of claim 7 wherein said step of communicating said identification data further comprises the step of communicating said identification data via an unstructured data message.

12. The method of claim 11 wherein said unstructured data message comprises a Short Message Service (SMS) message.

13. A mobile station for establishing a call connection within a mobile telecommunications network, said mobile telecommunications network providing mobile service for a particular geographic area wherein a plurality of independent beacons are selectively placed throughout said geographic area, each of said plurality of beacons broadcasting identification data uniquely identifying said beacon and said mobile telecommunications network includes an application module that determines the location of said mobile station as being approximate to the known locations of certain plural ones of the plurality of beacons with the strongest received signal strength identified by the received identification data communicated from said mobile station to said mobile telecommunications network, said mobile station comprising:

receiving means for receiving identification data from at least a portion of said plurality of beacons, including certain plural ones of said plurality of beacons with the strongest received signal strength, over a first radio communication channel;

transceiving means for establishing a call connection with a particular telecommunications terminal (TT) through said mobile telecommunications network over a second communication channel, wherein said transceiving means further transmits said received identification data from said certain plural ones of said plurality of beacons towards said mobile telecommunications network over said second communication channel in connection with said call connection; and an application module associated with said transceiving means for periodically transmitting said received identification data towards said mobile telecommunications network over said second communications channel during the call connection.

14. The mobile station of claim 13 wherein said first and second communications channels comprise different time slots within a Time Division Multiple Access (TDMA) communications system.

15. The mobile station of claim 13 wherein said first and second communications channels comprise different frequencies within an analog radio communications system.

16. The mobile station of claim 13 wherein said transceiving means transmits said identification data towards said mobile telecommunications network by including said identification data within a call setup signal requesting said call connection towards said TT through said mobile telecommunications network.

17. The mobile station of claim 16 wherein said call setup signal comprises a Direct Transfer Application Part (DTAP) based call setup signal.

18. The mobile station of claim 13 wherein said identification data are transmitted towards said mobile telecommunications network by transmitting said identification data within an unstructured data message transmitted over a control channel.

19. The mobile station of claim 13 wherein said unstructured data message comprises a Short Message Service (SMS) message.

* * * * *